US008363882B2

(12) United States Patent
Landwehr et al.

(10) Patent No.: US 8,363,882 B2
(45) Date of Patent: Jan. 29, 2013

(54) USER DISCERNIBLE WATERMARKING

(75) Inventors: John Landwehr, San Mateo, CA (US); Chris Hock, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 38 days.

(21) Appl. No.: 11/493,715

(22) Filed: Jul. 25, 2006

(65) Prior Publication Data

US 2008/0025554 A1   Jan. 31, 2008

(51) Int. Cl.
*G06K 9/00* (2006.01)
(52) U.S. Cl. ....................................................... 382/100
(58) Field of Classification Search .................. 382/100; 358/3.28; 713/176; 345/632; 380/54
See application file for complete search history.

(56) References Cited

U.S. PATENT DOCUMENTS

| | | | |
|---|---|---|---|
| 6,141,753 A | 10/2000 | Zhao et al. | |
| 6,182,218 B1* | 1/2001 | Saito | 713/176 |
| 7,269,735 B2 | 9/2007 | Raley et al. | |
| 7,639,833 B2* | 12/2009 | LeComte et al. | 382/100 |
| 2001/0021926 A1* | 9/2001 | Schneck et al. | 705/54 |
| 2002/0126869 A1* | 9/2002 | Wang et al. | 382/100 |
| 2003/0142361 A1* | 7/2003 | Walton | 358/3.28 |
| 2006/0028689 A1* | 2/2006 | Perry et al. | 358/3.28 |
| 2006/0072785 A1* | 4/2006 | Davidson et al. | 382/100 |
| 2006/0133644 A1* | 6/2006 | Wells et al. | 382/100 |
| 2006/0251289 A1* | 11/2006 | Williams | 382/100 |
| 2007/0019244 A1* | 1/2007 | Rekiere | 358/3.28 |
| 2007/0130467 A1* | 6/2007 | Beck et al. | 713/176 |

FOREIGN PATENT DOCUMENTS

WO     01/67667     9/2001

OTHER PUBLICATIONS

Hartung, F., Digital Watermarking and Fingerprinting of Uncompressed and Compressed Video, 2000, Shaker Verlag, pp. 132-137.*
International Preliminary Report on Patentability mailed Jan. 27, 2009 for related Patent Application No. PCT/US2007/066230, 11 pages.

* cited by examiner

*Primary Examiner* — Vikkram Bali
(74) *Attorney, Agent, or Firm* — Robert C. Kowert; Meyertons, Hood, Kivlin, Kowert & Goetzel, P.C.

(57) ABSTRACT

Briefly, in accordance with one embodiment, a server may parse content into one or more segments, and process the segments to identify where in the content one or more watermarks may be added. The segments may then be concatenated into processed content that includes watermarking instructions. The processed content may be transmitted to a client for rendering. In some embodiments, the watermarking may be applied dynamically at a server prior to or concurrently with transmission to the client. If the client encounters an instruction to add a watermark, the client may render a watermark based at least in part on client information and/or information capable of identifying the client's user. The watermark may be placed at locations in the content so that the content is discernible by a user, while also being placed within a context of the content so as not to distract from the content experience.

27 Claims, 7 Drawing Sheets

USER DISCERNIBLE WATERMARKING

BACKGROUND

Watermarking may be used to track the distribution of content, whether lawful or unlawful. Typically, such watermarking may be invisible such that the watermarking is added to the bits of the content without altering the visual and/or audio characteristics of the content. Such invisible content may only be detectable by a computer that processes the data bits to determine the presence of the watermark, but not by a user via visual inspection of the content. Often a user may not even realize that the content is watermarked in such an invisible manner, and therefore may not be deterred from distributing the content without proper authorization. In other watermarking schemes, a watermark such as a logo may be added to a peripheral portion of the content so that the watermark is readily viewable by the user. Typically, such a watermark may be translucent so as to lessen any visual distraction or obscuring of the source content. However, such visible watermarks are out of place with respect to the content, and do not fit within the context of the content so as in any event to be distracting from and/or annoying to the user. Furthermore, such a visible watermark may not provide deterrence to the user from unauthorized distribution of the content since, for example, some users may merely crop out the watermark disposed at the periphery and resize the resulting content so as to eliminate such a visible watermark. In addition, typical watermarks on video are not uniquely identifying but are common across all copies of the content.

DESCRIPTION OF THE DRAWING FIGURES

Claimed subject matter is particularly pointed out and distinctly claimed in the concluding portion of the specification. However, both as to organization and/or method of operation, together with objects, features, and/or advantages thereof, may best be understood by reference to the following detailed description when read with the accompanying drawings in which:

Figure 6:
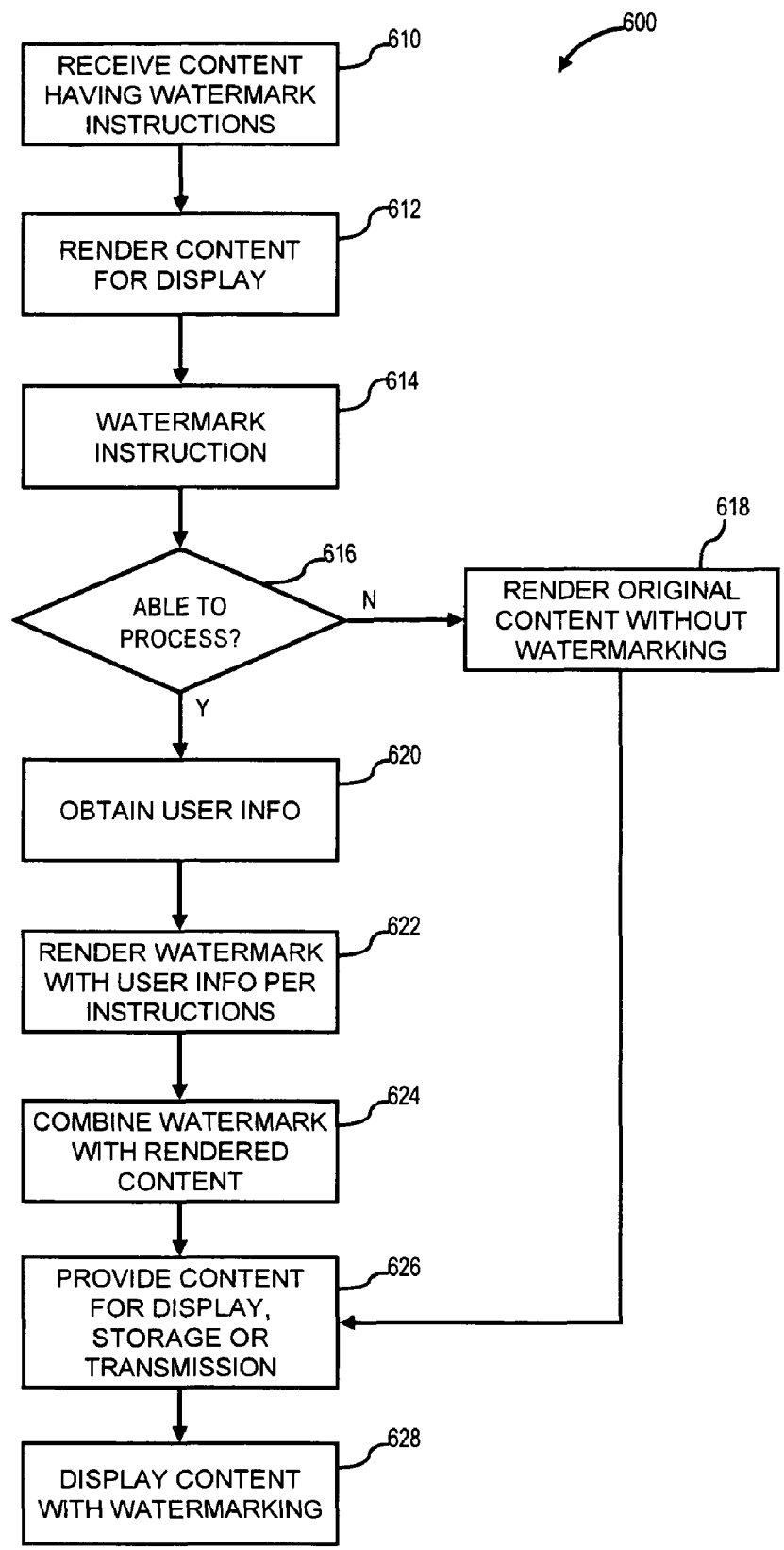
Figure 7:
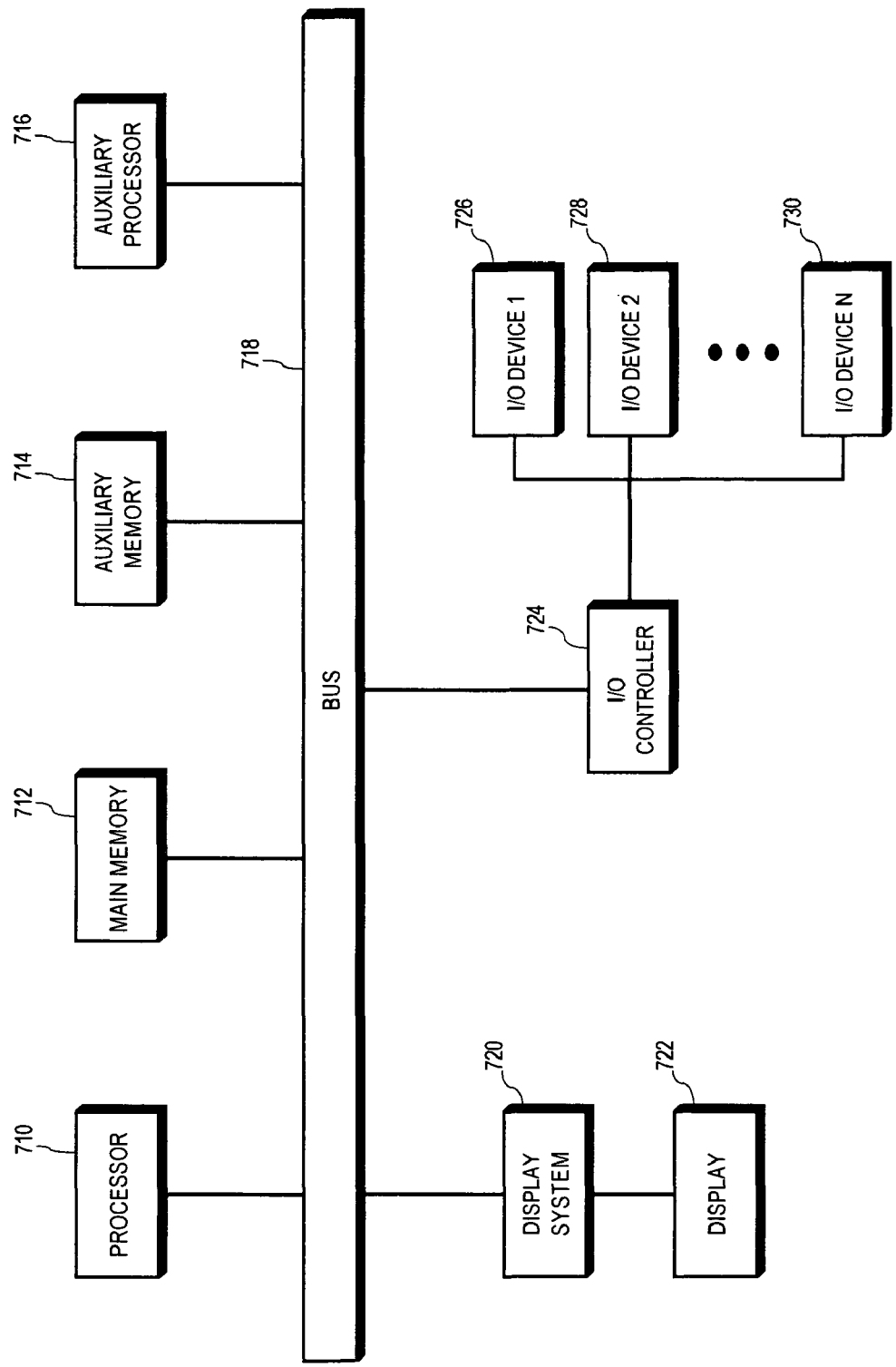

FIG. 6 is a flow diagram of a method to render content having watermarking instructions, and/or to render a watermark for the content based at least in part on watermarking instructions in accordance with one or more embodiments; and FIG. 7 is a block diagram of an information handling system able to process content to provide watermarking instructions and/or to render a watermark in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

An algorithm and/or process may be generally considered to be a self-consistent sequence of acts and/or operations leading to a desired result. These include physical manipulations of physical quantities. Usually, though not necessarily, these quantities take the form of electrical and/or magnetic signals capable of being stored, transferred, combined, compared, and/or otherwise manipulated. It has proven convenient at times, principally for reasons of common usage, to refer to these signals as bits, values, elements, symbols, characters, terms, numbers and/or the like. It should be understood, however, that all of these and/or similar terms are to be associated with the appropriate physical quantities and are merely convenient labels applied to these quantities.

Unless specifically stated otherwise, as apparent from the following discussions, it is appreciated that throughout the specification discussion utilizing terms such as processing, computing, calculating, determining, and/or the like, refer to the action and/or processes of a computer and/or computing system, and/or similar electronic computing device, that manipulate or transform data represented as physical, such as electronic, quantities within the registers and/or memories of the computer and/or computing system and/or similar electronic and/or computing device into other data similarly represented as physical quantities within the memories, registers and/or other such information storage, transmission and/or display devices of the computing system and/or other information handling system.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. The term content may refer to information in an electronic and/or digital and/or analog format, and may include audio information, video information, audio/video information, and/or any time-based media in general. The term sequence may mean a number of units of time, a number of bits, a number of frames, a number of pages, a segment or a portion of a larger quantity, and/or a number of units in general, in a linear arrangement or in a non-linear or other arrangement, or combinations thereof. The term parsing may refer to the analyzing and/or separating of information or data into smaller components that are more easily processed than larger components. The term concatenate may refer to the arrangement of components into combined or chained components. The term render may refer to the converting of information or data into an audio and/or visual form. The term watermark may refer to the insertion of a pattern or other information into content such as an audio and/or video file that identifies information pertaining to the file, the source/and or origin of the file, and/or the user of the file, or similar type of information. The term transform may refer to the changing of the nature, function, and/or condition of an item, data, file, component, and/or object. The term discern may refer to the perception or recognition of a distinction and/or difference, and/or a distinguishing characteristic. However, these are merely example definitions, and the scope of the claimed subject matter is not limited in this respect.

Figure 1:
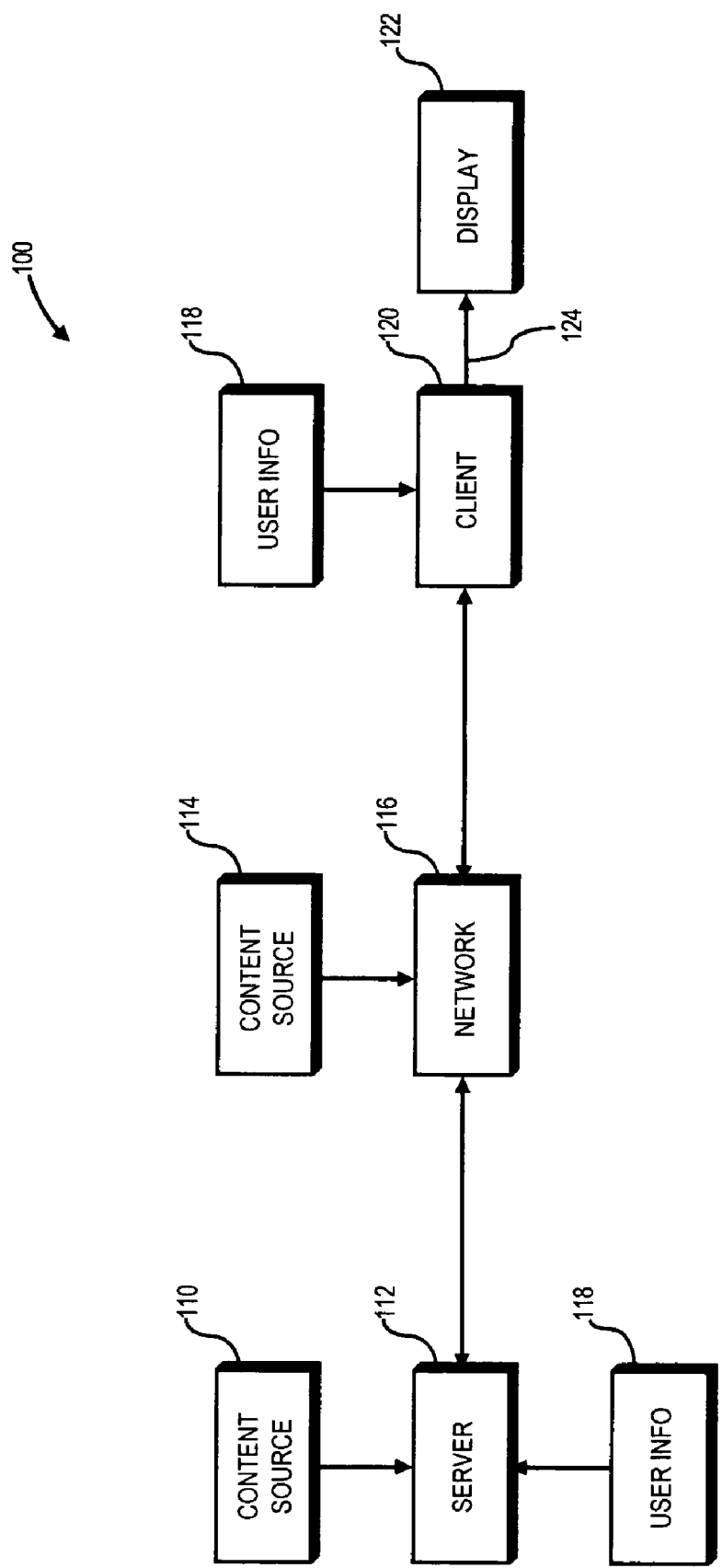
FIG. 1 is a block diagram of a content delivery system in accordance with one or more embodiments.

Referring now to FIG. 1, a block diagram of a content delivery system in accordance with one or more embodiments will be discussed. As shown in FIG. 1, content delivery system 100 may include a content source 110 that is capable of providing content to server 112. Server 112 may be utilized for receiving content from content source 110, and for processing the content as desired prior to delivery of content to client 120. In one or more embodiments, server 112 may deliver content to client 120 via network 116. Network 116 may be any suitable type of network such as a local area network (WAN), wide area network (WAN), a wired network and/or a wireless or broadcast type network, or combinations thereof such as a public switched telephone network (PSTN) type network, a packet switched network, a cellular telephone network, and/or the like. In one particular embodiment, at least some portion of network 116 may comprise the Internet or the like. However, the scope of the claimed subject matter is not limited in these respects.

In one particular embodiment, content source 110 may comprise a television and/or video type channel, network, internet protocol television network and/or system or the like and may provide content such as a movie or programming content to server 112. In one or more particular embodiments, content source may comprise a movie studio and/or distributor. Server 112 may be part of a cable, satellite, and/or similar type of video and/or television network. For example, server 112 may comprise a pay-per-view type programming system or the like type of on-demand type programming system capable of serving content received from content source 110 to client 120 via network 116. In one or more alternative embodiments, server 112 may be capable of obtaining content from one or more alternative content sources such as content source 114 for example via network 116. In such embodiments, for example, server 112 may obtain content from content source 114 per the request of client 120, and/or client and/or some other third party may otherwise cause content to be transferred from content source 110, content source 114, and/or other sources or locations, or combinations thereof, for ultimate delivery to client 120.

In accordance with one or more embodiments, as will be further discussed herein, server 112 may receive content from a content source such as content source 110 and/or content source 114, and process the content for delivery to client 120. Such processing may be at least partially conducive to adding a discernible watermark such as a visual watermark to the content, and/or may be capable of adding an analogous watermark to the content that may not be necessarily visual, for example by adding an audible watermark where content is an audio type of content. However, these are merely example types of watermarks, and the scope of the claimed subject matter is not limited in these respects. In general, in or more embodiments, user information 118 may be entered into or otherwise available at client 120 to generate a watermark for content capable of being displayed on display 122. In one or more alternative embodiments, user information may 118 may be entered into or otherwise available at server 112 to generate a watermark for content capable of being displayed on display 120. Such a generation of a watermark, whether performed at the client side on client 120 or at the server side on server 112, may occur dynamically as content is delivered and/or rendered either at server 112 or client 120. In such embodiments, user information 118 may be sent from server 112 to client 120 and/or sent from client 120 to server 112 at the time or otherwise contemporaneously with time when content is being delivered via network 116. In such embodiments, user information 118 may be rendered into the content as a watermark before the content is transmitted via network 116. However, these are merely examples of how, when, and/or where user information may be rendered into content via content delivery system 100, and the scope of the claimed subject matter is not limited in these respects.

In one or more embodiments, the watermark and/or watermarks added to the content may be based at least in part on user information 118 corresponding to a user of client 120. For example, client 120 may comprise a set top box or the like, for example a cable television receiver, a satellite television receiver, a personal computer, a cellular telephone, or the like type of device capable of receiving content from server 112 via network 116 and displaying the content on display 122. Such a client 120 may include user information 118 stored thereon such as an identifying code, serial number, registration number, Internet Protocol (IP) address, Uniform Resource Locator (URL) type address, or other similar information that is capable of uniquely identify the device corresponding to client 120 and/or the user of client 120. Such user information 118 may be stored in client 120 or in a device or memory external to client 120, for example in a smart card and/or a non-volatile type memory device such as flash memory or the like. In one or more embodiments, user information 118 may comprise information that is capable of more particularly identifying client 120 and/or the user of client 120. Examples of such user information 118 may include one or more of a name, and address, telephone number, age, gender, electronic mail address, a URL and/or homepage, a photograph, a movie, a recording, a file, and/or any other information or form of information capable of identifying client 120 and/or the user of client 120. However, these are merely examples of information types, and the scope of the claimed subject matter is not limited in these respects.

In one or more embodiments, server 112 may process received content in a manner that allows client 120 to be capable of adding a watermark to the content received and/or rendered by client 120. If client 120 provides the content at an output 124 of client 2120 for displaying the content on display 122, the content provided at output 124 may include the watermark as part of the content. In one or more embodiments, intermixing of the content and user information 118 as a watermark may occur prior to content reaching output 124 and prior to being displayed on display 122. In one or more embodiments, watermarked content may bypass display 122 altogether, for example content may be provided to a file or as a live stream. Such intermixing of content and user information 118 may occur at various points for example at client 120 or alternatively at server 112. If display 122 displays the content, the watermark may appear at one or more locations and/or time slots of the content. Such watermarking may allow for the identification of the particular user of client 120 that received the content at client 120. Such a watermarking arrangement may be utilized, for example, in a digital rights management scheme so that if the user attempted to capture the content at output 124, for example by saving the content to electronic memory, the content will include the watermark. The watermark may discourage the user from unlawful and/or unauthorized distribution of the content and/or may assist to identify the user of client 120 during the investigation of unlawful distribution, reproduction, and/or counterfeiting of the content. Thus, in one or more embodiments, the watermark may be dynamically rendered into content based at least in part on user information 118 as the content itself is rendered and/or otherwise processed. Such dynamic rendering of a watermark into content may occur upstream at the server side with server 112, and/or downstream at the client side with client 120. In any event, the dynamic rendering of a watermark into content may occur before the content is viewed, saved to disk, or streamed from one location to another, although the scope of the claimed subject matter is not limited in these respects. In some embodiments, user information 118 may be delivered along with content from content source 114 or content source 114 via server 112 and/or via network 116 to be mixed at client 120. For a example, a user ID may be sent upstream from client 120 via network 116 to server 112 such as when client 120 requests the downloading of content from server 112 or from network 116. User information 118 sent from client 120 may be utilized, for example, to process the request for content such as for authentication or authorization purposes. Such authentication or authorization may be provided, for example, by another server coupled to network 116 such as via the Internet, via a Lightweight Directory Access Protocol (LDAP) directory, or the like. In response to such authentication and/or authorization, server 112 and/or network 116 may respond accordingly and send user information 118 and/or other type of information, such as an authorization key, to client 120 along with the requested content. However, this is merely one example of a type of authentication and/or authorization system, and the scope of the claimed subject matter is not limited in this respect.

Figure 2:
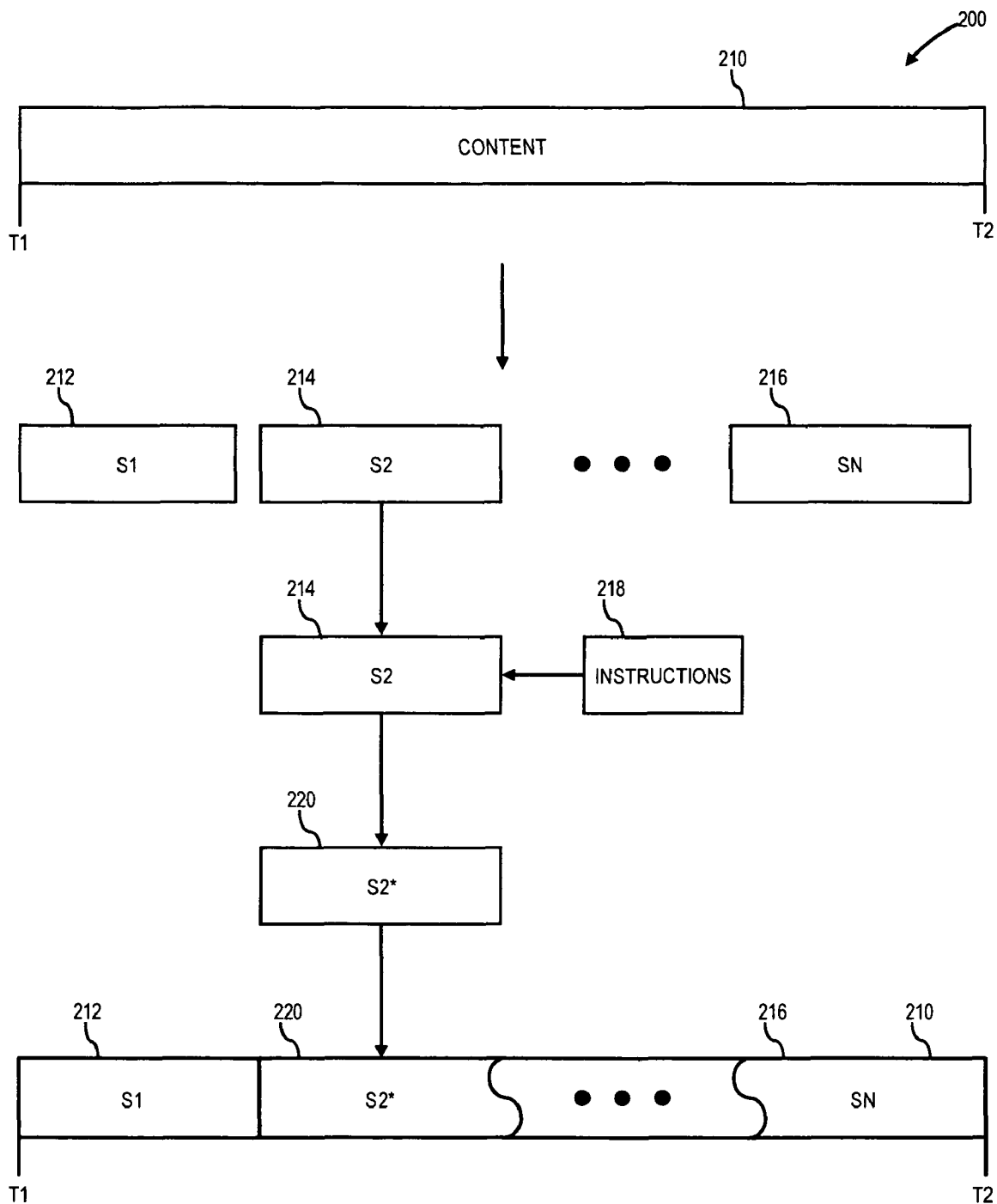
FIG. 2 is a diagram illustrating the parsing of content into one or more segments for processing and the subsequent recombining of the segments in accordance with one or more embodiments.

Referring now to FIG. 2, a diagram illustrating the parsing of content into one or more segments for processing and the subsequent recombining of the segments in accordance with one or more embodiments will be discussed. As shown in FIG. 2, parsing 200 of content 210 may occur as follows. Content 210 may be at least partially defined by a start time, T1, and/or by an end time, T2 do define a time or time frame. Server 112 may divide content 210 into one or more segments, such as segment 212 (S1), segment 214 (S2), up to an Nth segment, segment 216 (SN). In such an arrangement, the segments may represent a portion of content 210, for example a short passage or scene of a movie where the movie may correspond to content 210. Server 112 may identify one or more of the segments in which it may be desirable to add a watermark. In the embodiment shown in FIG. 2, segment 214 may be identified as a segment in which a watermark may be added. In one or more alternative embodiments, content 210 may include one or more locations or segments in which a watermark may be added, either intentionally added to content 210 when content 210 was created, and/or at a location or segment in which it may not be an intentional location for adding a watermark but which may be an otherwise suitable location at which a watermark is capable of being added. In such alternative embodiments, server 112 may identify such a location and/or locations that may be suitable for adding one or more watermarks. An example of how and/or where a watermark may be added at such an identified location is shown in and described with respect to FIG. 4, below. In any event, server 112 may add instructions 218 to add a watermark at a particular location and/or coordinates of segment 214. Such instructions 218 may be processed by client 120 when displaying content 210 on display 122 wherein client 120 may add a watermark when indicated by instructions 218 at coordinate locations and/or for a duration indicated by instructions 218. When server 112 adds such instructions 218 to segment 214, segment 214 may be considered a transformed segment, segment 220 (S2*), that includes instructions to a remote device such as client 120 when and where to add a visual watermark to segment 220. After one or more of the segments are transformed with instructions regarding watermarking, server 112 may then concatenate the segments back together to reproduce processed content 210 where process content may substantially correspond to the originally received content 210 but with one or more transformed segments having instructions stored therein and/or therewith indicative of watermarking. Content 210 may be obtained, for example, from a file if previously stored and/or content 210 may be live, real-time or nearly real time content such as content streaming from network 116 such as via the Internet. It should be apparent that parsing process 200 as shown in FIG. 2 is merely one embodiment representing the parsing of content 210 to result in instructions for watermarking content 210, and that other alternative parsing type processes may be utilized to indicate watermarking of content 210, and the scope of the claimed subject matter is no limited in this respect.

Figure 3:
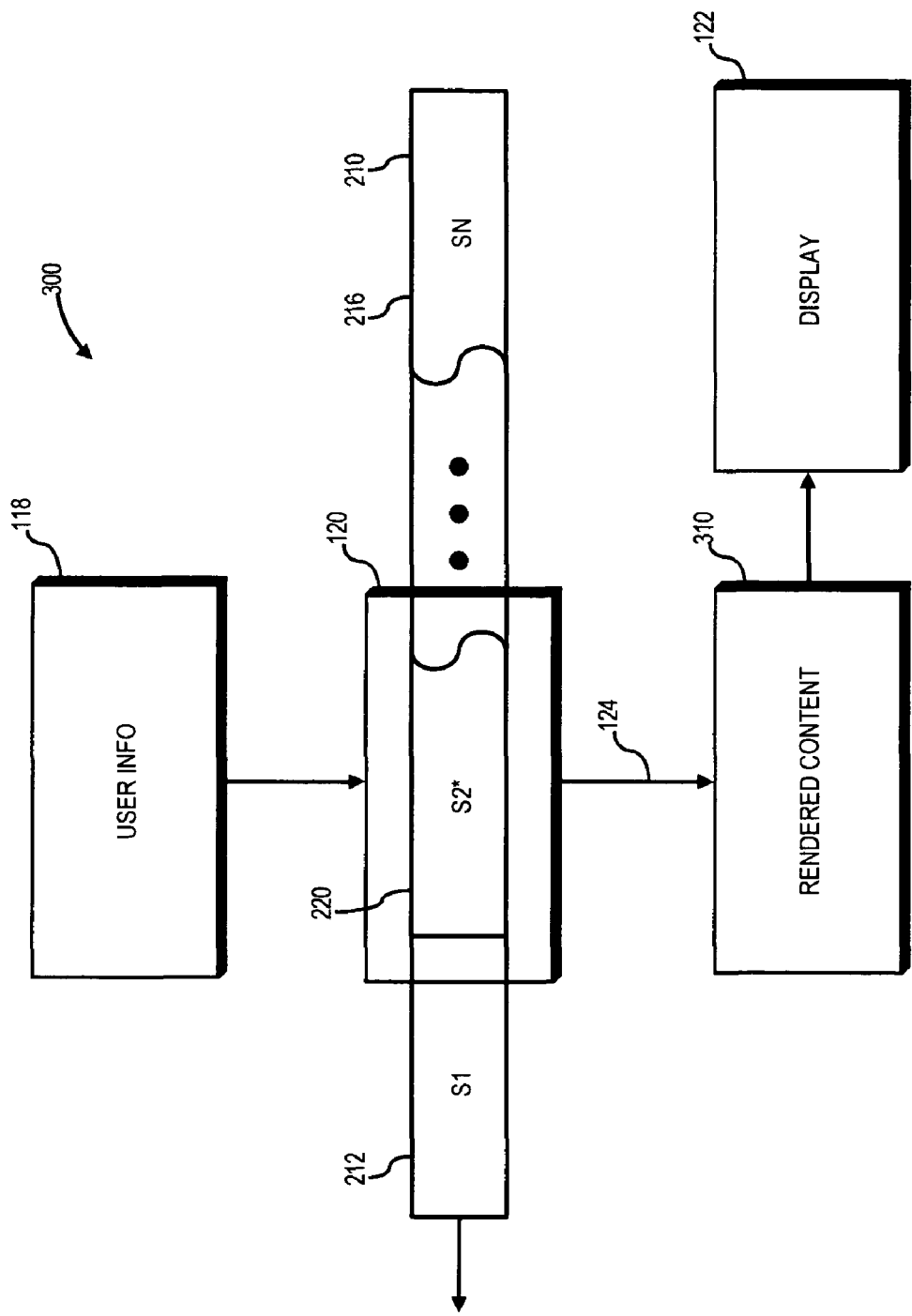
FIG. 3 is a diagram illustrating the rendering of previously processed content to provide a discernible watermark in accordance with one or more embodiments.

Referring now to FIG. 3, a diagram illustrating the rendering of previously processed content to provide a discernible watermark in accordance with one or more embodiments will be discussed. As shown in FIG. 3, rendering 300 of content may involve the following. Client 120 may receive content 210 that may have been parsed by server 112, for example as shown in FIG. 2, to provide instructions on watermarking of content 210. Content 210 may be received from server 112 and may be streamed for real time and/or nearly real time rendering and displaying of content 210, for example on display 122 coupled to client 120. In an alternative embodiment, content 210 may be stored or otherwise cached to a memory, hard disk drive, or similar type of storage, disposed within and/or coupled to client 120. In one or more embodiments, client 120 may render content 210 on the fly as it is being displayed on display 122. In such an arrangement, if client 120 renders content corresponding to transformed segment 220 having instructions for watermarking, client 120 may obtain watermarking information from a watermark source, for example client 120 may obtain user information 118 that may be stored, for example, on a non-volatile type memory, hard disk drive, and so on. Client 120 may render such a watermark at one or more of a predetermined time and/or location of content 210 so that resulting rendered content 310 to be displayed on display 122 will include the watermark as part of the resulting information provided at output 124 of client 120. In one or more embodiments, client 120 may be at least partially realized in hardware, and in one or more alternative embodiments client 120 may be at least partially realized in software, or combinations thereof. In any event, content 210 rendered by client 120 may include user information 118 and/or the like type of identifying information resulting at an output 124 of client 120 so that, for example, the user of client 120 may be identified. Rendering 300 of content 210 as shown in FIG. 3 is merely one example of how a watermark may be applied to content 210, and the scope of the claimed subject matter is not limited in this respect.

Figure 4:
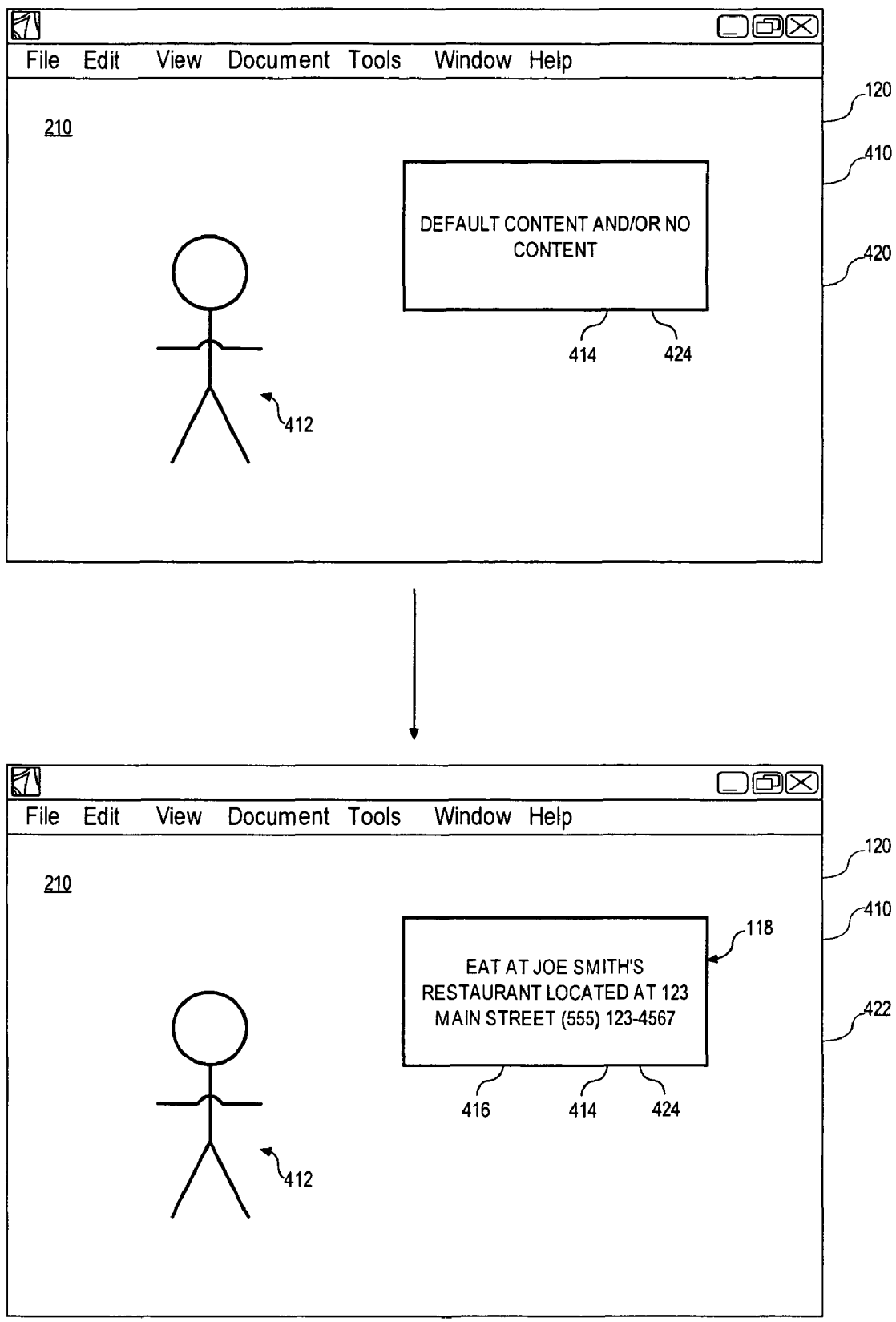
FIG. 4 is a diagram illustrating the discernible watermarking of content in accordance with one or more embodiments.

Referring now to FIG. 4, a diagram illustrating the discernible watermarking of content in accordance with one or more embodiments. As shown in FIG. 4, content 210 may be rendered using client 120 which may comprise a computer program running on a hardware platform and/or may at least partially comprise the hardware platform itself, for example using hardware codecs. In one or more embodiments, client 120 may comprise a computer program 410 capable of running on hardware. For example, client 120 may comprise Adobe® Acrobat® and/or Adobe Flash Player type software available from Adobe Systems Incorporated of San Jose, Calif., USA. Client 120 may comprise various other types of computer programs, for example Adobe® Premiere® Pro 2.0 type software or Adobe Flash® Professional 8 or the like type of software both available from Adobe Systems Incorporated. Likewise, the same and/or similar type of software may be utilized on server 112 to parse and process content 210 for watermarking as shown in and described with respect to FIG. 2.

In one or more embodiments, content 210 may include content portion 412 and content portion 414. Content portion 412 may refer to an item, object, person, location, or the like where a watermark may not be desired for content 210. Content portion 414 may refer to an item, object, person, location, or the like where a watermark may be desired. Content portion 414 may have default content and/or no content prior to parsing and/or processing of content 210 by server 112 for watermarking instructions. Thus, in one embodiment, where client 112 does not have the capability to process the instructions stored in content at segment 220 to add a watermark, or where such capability to process the watermark instructions is turned off or not enabled, for example for older versions of client 120 and/or legacy clients or systems, client 120 may still be able to render content 210 for displaying on display 122 without disruption or without providing any out of place or blank information at second content portion 414 when no watermarking of content 210 occurs. Such non-watermarked content of second content portion 414 may be represented at view 420.

However, when client 120 is capable of processing watermarking instructions appearing in content 210, for example at segment 220, the watermark 416 may be rendered at content portion 414 as shown in second view 422. The watermark 416 rendered at content portion 414 may comprise user information 118 that may identify the user of client 120. In the example shown, if the user's name is Joe Smith, the user's address is 123 Main Street, and/or the user's telephone number is (555) 123-4567, such user information 118 may be part of the watermark 416. In one embodiment, the watermark 416 may be formed by adding a layer 424 over content portion 414 so that layer 424 is visible and the default and/or no content as appearing in the unprocessed content is not visible as it is at least partially obscured by layer 424. This may occur, for example, without any change to the default and/or no content appearing in the original unprocessed content 210. In such an embodiment, layer 424 may be later optionally altered, and/or removed to reveal the original content at content portion 414, which may be controlled, for example via user access rights mechanisms. In an alternative embodiment, the watermark 416 information may replace the data corresponding of the default and/or no content of the original content 210 at content portion 414. In such an embodiment, once the default and/or no content of content portion 414 is replaced with the watermark 416, the default and/or no content of the original unprocessed content 210 may be discarded such that the default and/or no content may not be later retrieved or accessed. In some embodiments, content 210 may comprise visual content, and in other embodiments, content 210 may comprise audio content. However, these are merely examples of how client 120 may render a watermark 416 on or in content 210, and the scope of the claimed subject matter is not limited in this respect.

In one or more embodiments, the watermark 416 may comprise visual information from which a user of client 120 may be identified. In one or more embodiments, it may be readily apparent and/or obvious to any viewer that watermark 416 is meant to identify the user, and that watermark 416 has little or no relationship to other non-watermarked content 412 in the scene. In one or more alternative embodiments, the fact that the scene has been watermarked with identifying information, such as user information 118 may be more subtle and/or nor readily apparent to the user and/or to a typical view of content 210. In one or more embodiments, the instructions may comprise information directing the placement in the content when the content is rendered. In one or more alternative embodiments, the instructions may comprise information directing the placement of the watermark at a location of the content, the location of the content being contextually integrated with the subject matter of the content at the location where the watermark is placed. In further alternative embodiments, the instructions may comprise information directing the placement of the watermark at a location of the content, the watermark comprising user information capable of contextually integrating with the subject matter of the content at the location where the watermark is placed. For example, the default content at content portion 414 may include a billboard that refers to a restaurant as part of the scene shown at view 420. When watermark 416 is added at content portion 414, the watermark 416 may comprise user information 118 that subtly replaces the restaurant information in scene 420 so that at scene 422 the restaurant information may include user information. In such an arrangement, a casual viewer of content 210 may not even notice the difference between scene 420 and scene 422 as the watermark 416 of user information may be designed to blend in with the default content. For example, user information may use the same font or similar font and/or styling as the default content. This would allow users to view content 210 without noticing that content 210 has been watermarked with user information 118, but would allow for the identification of the user by having someone look for watermark 416 and user information 118 when desired. In other embodiments, watermark 416 may add user information 118 so that when the scene is viewed at view 422, it may be apparent to most or all viewers that the watermark 416 is present and that the identity of the user may be readily discerned to provide a deterrent effect to the user, but while simultaneously not being so obstructive that the viewing experience is detrimentally altered. In yet other embodiments, there may be some indication or cue of the presence of watermark 416 on the scene at view 422, for example an audible tone or other sound, or some visual effect that is clearly not part of content 210 such as bright coloring or flashing of watermark, or the word "watermark" or the like appearing along with user information 118, or similar indications or cues. However, these are merely example types of watermarks and/or indications of watermarks, and the scope of the claimed subject matter is not limited in these respects.

Figure 5:
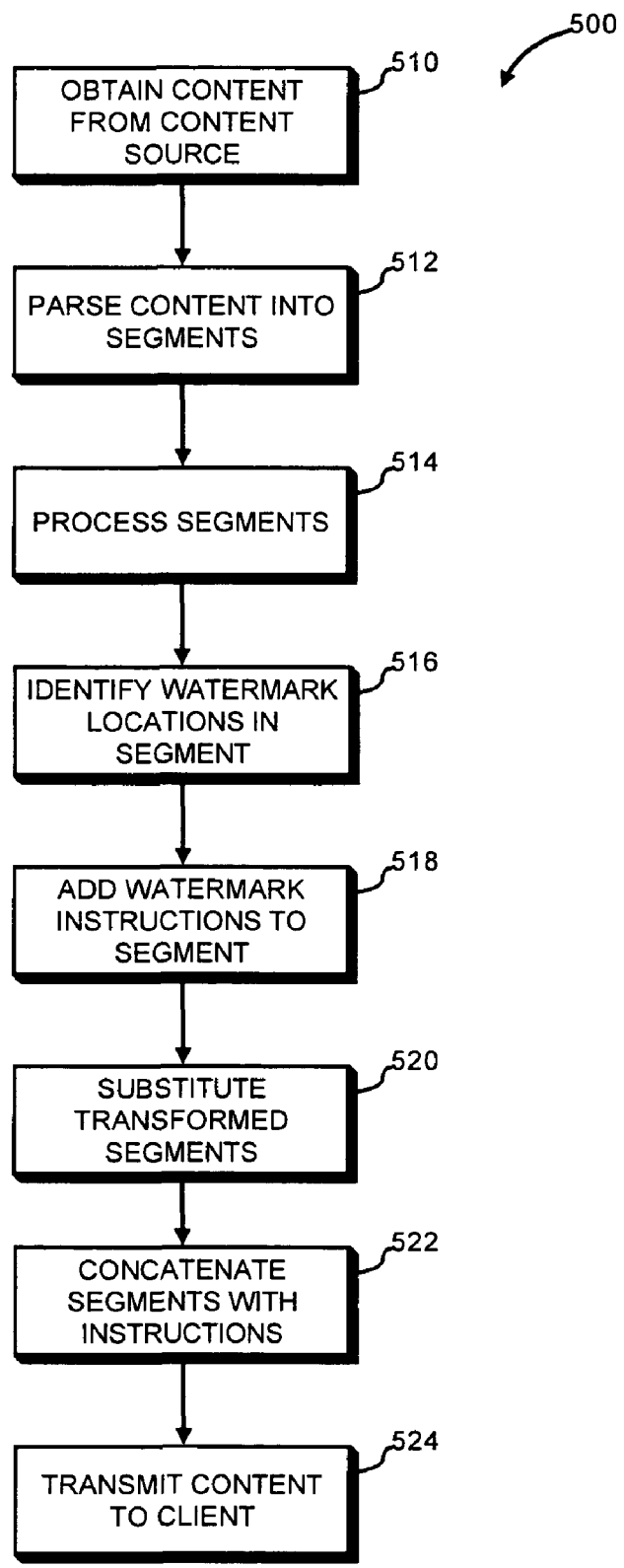
FIG. 5 is a flow diagram of a method to process content to identify one or more watermark locations in content, and/or to provide watermarking instructions in accordance with one or more embodiments.

Referring now to FIG. 5, a flow diagram of a method to process content to identify one or more watermark locations in content, and/or to provide watermarking instructions in accordance with one or more embodiments will be discussed. Method 500 of FIG. 5 may include more or fewer blocks than shown, and/or the blocks of method 500 may furthermore be arranged into one or more alternative orders shown in FIG. 5, and the scope of the claimed subject matter is not limited in this respect. Method 500 may be executed for example by a computer program 410 executing on server 112 of FIG. 1, and may comprise any one or more of the computer programs discussed with respect to FIG. 4 or the like. Server 112 may obtain content 210 at block 510 from any one or more available content sources such as content source 110 and/or content source 114. Content 210 may then be parsed into one or more segments at block 512, for example as shown in and described with respect to FIG. 2. One or more of the segments may be processed at block 514, wherein content contained within the segments may be analyzed, and one or more locations in a given segment may be identified at block 516 as suitable for a watermark. Server 112 may then add watermark instructions to that segment at block 518 wherein the coordinate locations of the watermark may be specified, along with the time and duration of the watermark within the segment, and/or any other instructions pertaining to the segment such as video information for the watermark such as color, hue, saturation, contrast, font size and/or font type, and so on. Where audio watermarking is desired and/or appropriate, similar audio information data may accompany the instructions. However these are merely example watermark instructions and/or example data to accompany the watermark instructions, and the scope of the claimed subject matter is not limited in this respect.

When watermarking instructions are added to a given segment, the segment may be considered as a transformed segment since the segment has been processed to include additional information not present in the original content segment. The segments may be concatenated at block 522, for example as illustrated in FIG. 2, wherein transformed segments having watermarking instructions are substituted for their respective segments prior to adding watermarking instructions at their respective segment locations. In one or more embodiments, the transformed segments may be concatenated along with non-transformed segments in an order substantially corresponding to the order of the original, non-processes segments to arrive at content 210 with a difference being that transformed segments are substituted for their respective non-processed segments. The resulting content 210 processed as in method 500 may be transmitted at block 524, for example to client 120. In one or more embodiments, content 210 resulting from such a concatenation of processed segments may be indistinguishable from content 210 when rendered and/or played back by a client or device that is unable to process the instructions stored in the processed content so that if watermarking is not added to content by a client or device during playback, there is no detraction from the playback experience. In one or more alternative embodiments, if a device is unable to process the watermarking instructions stored in processed content 210, then the client and/or device, for example if the client and/or device lacks an appropriate watermarking instruction decoder, then the client and/or device may be unable to playback and/or render the processed content for playback and/or display, for example to implement a digital rights management scheme. However these are merely example embodiments for playing back of content having watermarking instructions, and the scope of the claimed subject matter is not limited in this respect. Details of one or embodiments of a method for rendering and/or display of such content by a client and/or device is discussed with respect to FIG. 6.

Referring now to FIG. 6, a flow diagram of a method to render content having watermarking instructions, and/or to render a watermark for the content based at least in part on watermarking instructions in accordance with one or more embodiments will be discussed. Method 600 of FIG. 6 may include more or fewer blocks than shown, and/or the blocks of method 600 may furthermore be arranged into one or more alternative orders shown in FIG. 6, and the scope of the claimed subject matter is not limited in this respect. Method 600 may be executed for example by a computer program 410 executing on client 120 of FIG. 1, and may comprise any one or more of the computer programs discussed with respect to FIG. 4 or the like. Client 120 may receive content 210 at block 510 that was previously processed to add watermarking instructions, for example by server 112 by a method such as shown in and described with respect to FIG. 2 and/or FIG. 5. Such processed content 210 may be rendered at block 612 for display such as on display 122 and/or for storage for later display. As client 120 is rendering the processed content 210, client 120 may encounter a watermark instruction at block 614. A determination may then be made at block 616 whether client 616 is able to process the watermark instruction. In one embodiment, if client 120 is not able to process the watermark instruction, client 120 may render the original content at block 618 without including any watermarking the rendered content. In an alternative embodiment, if client is not able to process the watermark instruction, client 120 may be prohibited from rendering the content, for example as a violation of a digital rights management scheme, and processing of content 210 may end. If client 120 is able to process the watermark instruction, client 120 may obtain user information 118 at block 620 to be utilized at least in part to generate a watermark. Client 120 may then render a watermark at block 622 based at least in part on user information 118 according to the watermarking instructions encountered at block 614. In one or more embodiments, the watermark may be rendered at block 622 along with rendered content 210, and the resulting watermarked content may be provided at block 626, for example to display 122 and/or to storage for later display. In any event, when the resulting watermarked content is displayed at block 628, content 210 will include one or more watermarks that may be capable, for example, of identifying client 120 and/or user of client 120. Whenever and/or wherever the watermarked content is displayed, content 210 may include one or more watermarks by which user and/or client 120 may be identified. For example, if watermarked content captured at output 124 and transmitted to a different user, it may be apparent and/or otherwise determinable that such content was originally sent to client 120, and may indicate that such a copy of the content may not be an authorized copy of content 210. However, these are merely example scenarios in which content 210 may be watermarked with one or more watermarks capable of identifying client 120 and/or user of client 120, and the scope of the claimed subject matter is not limited in these respects. For example, in one or more alternative embodiments, method 600 of FIG. 6 may be executed on server 112 wherein watermarking is added to content 210 by server 112 prior to transmission of content 210 to client 120. In such an embodiment, client 120 may have the capability of receiving, decoding, and/or displaying content 210, by may not have the capability of processing watermarking instructions. In such an arrangement, client 120 may request the transmission of content 210 from server 112 to client 120, and may transmit user information 118 along with the request. Server 112 may then receive user information 118 and add one or more watermarks to content 210 based at least in part on user information 118, and then transmit the resulting watermarked content to client 120. This may occur, for example, in a real-time and/or near real time scenario in which content is rendered on the fly along with the watermark by server 112 as content 210 is streamed to client 120. In such an embodiment, client 120 may comprise a cellular telephone or similar wireless device, and network 116 may comprise a cellular telephone network or similar wireless network wherein it may be more practical for server 112 to render content and render watermarking that to have client 120 render the watermarking. However, this is merely one example embodiment, and the scope of the claimed subject matter is not limited in this respect. In general, server 112 and/or client 120 may comprise various types of information handling systems and/or computing platforms as shown in and described with respect to FIG. 7.

Referring now to FIG. 7, a block diagram of an information handling system able to process content to provide watermarking instructions and/or to render a watermark in accordance with one or more embodiments will be discussed. Information handling system 700 may be utilized to tangibly embody computer program 410 of FIG. 4 by providing hardware components on which computer program 410 may be executed, for example to execute method 500 of FIG. 5 and/or method 600 of FIG. 6. Such a computer program 410 and/or machine readable instructions may be tangibly stored on a computer and/or machine readable medium such as a compact disk (CD), digital versatile disk (DVD), flash memory device, hard disk drive (HDD), and so on. As shown in FIG. 7, information handling system 700 may be controlled by processor 710. Processor 710 may comprise a central processing unit such as a microprocessor or microcontroller for executing programs, performing data manipulations and controlling the tasks of information handling system 700. Communication with processor 700 may be implemented via bus 718 for transferring information among the components of information handling system 700. Bus 718 may include a data channel for facilitating information transfer between storage and other peripheral components of information handling system 718. Bus 718 further may provide a set of signals utilized for communication with processor 710, including, for example, a data bus, and address bus, and/or a control bus. Bus 718 may comprise any bus architecture according to promulgated standards, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and so on, although the scope of the claimed subject matter is not limited in this respect.

Other components of information handling system may include, for example, main memory 712, and/or auxiliary memory 714. Information handling system 700 may further comprise auxiliary processing processor 716, which may be another processor, a digital signal processor, and so on. Main memory 712 may provide storage of instructions and data for programs to be executed by processor 710. Main memory 712 may be, for example, semiconductor-based memory such as dynamic random access memory (DRAM) and/or static random access memory (SRAM), and/or the like. Other semiconductor-based memory types may include, for example, synchronous dynamic random access memory (SDRAM), Rambus dynamic random access memory (RDRAM), ferroelectric random access memory (FRAM), and so on. Auxiliary memory 712 may be utilized to store instructions and/or data that to be loaded into main memory 712 before execution. Auxiliary memory 714 may include semiconductor based memory such as read-only memory (ROM), programmable read-only memory (PROM), erasable programmable read-only memory (EPROM), electrically erasable read-only memory (EEPROM), and/or flash memory, and/or any block oriented memory similar to EEPROM. Auxiliary memory 714 may also include any type of non-semiconductor-based memories, including but not limited to magnetic tape, drum, floppy disk, hard disk, optical, laser disk, compact disc read-only memory (CD-ROM), write once compact disc (CD-R), rewritable compact disc (CD-RW), digital versatile disc read-only memory (DVD-ROM), write once DVD (DVD-R), rewritable digital versatile disc (DVD-RAM), and so on. Other varieties of memory devices are contemplated as well. Information handling system 700 optionally include auxiliary processor 716 which may be an auxiliary processor to manage input/output, an auxiliary processor to perform floating point mathematical operations, a digital signal processor and/or any special-purpose microprocessor having an architecture suitable for fast execution of signal processing algorithms, a back-end processor and/or any slave type processor subordinate to processor 710, an additional microprocessor and/or controller for dual and/or multiple processor systems, and/or a coprocessor and/or additional processor. Such auxiliary processors may be discrete processors and/or or may be arranged in the same package as processor 710, for example in a multicore and/or multithreaded processor, however the scope of the claimed subject matter is not limited in these respects.

Information handling system 700 further may include display system 720 for connecting to display 722, and further may include input/output (I/O) controller 724 to connect to one or more I/O devices including, for example, I/O device 726, I/O device 728, up to an Nth I/O device, I/O device 730. Display system 720 may comprise a video display adapter having components for driving display 722, including, for example, video memory, a buffer, and/or a graphics engine. Such video memory may be, for example, video random access memory (VRAM), synchronous graphics random access memory (SGRAM), windows random access memory (WRAM), and/or the like. Display 722 may comprise a cathode ray-tube (CRT) type display such as a monitor and/or television, and/or may comprise an alternative type of display technology such as a projection type CRT type display, a liquid-crystal display (LCD) projector type display, an LCD type display, a light-emitting diode (LED) type display, a gas and/or plasma type display, an electroluminescent type display, a vacuum fluorescent type display, a cathodoluminescent and/or field emission type display, a plasma addressed liquid crystal (PALC) type display, a high gain emissive display (HGED) type display, and so forth. Input/output controller 724 may comprise one or more controllers and/or adapters to prove interface functions between one or more of I/O device 726, I/O device 728, and/or I/O device 730. For example, input/output controller 724 may comprise a serial port, parallel port, universal serial bus (USB) port, and IEEE 1394 serial bus port, infrared port, network adapter, printer adapter, radio-frequency (RF) communications adapter, universal asynchronous receiver-transmitter (UART) port, and/or the like, to interface between corresponding I/O devices such as a keyboard, mouse, trackball, touchpad, joystick, trackstick, infrared transducers, printer, modem, RF modem, bar code reader, charge-coupled device (CCD) reader, scanner, compact disc (CD), compact disc read-only memory (CD-ROM), digital versatile disc (DVD), video capture device, TV tuner card, touch screen, stylus, electro-acoustic transducer, microphone, speaker, audio amplifier, and/or the like. Input/output controller 724 and/or I/O device 726, I/O device 728, and/or I/O device 730 may provide and/or receive analog and/or digital signals to communicate between information handling system and external devices, networks, and/or information sources. Input/output controller 724 and/or I/O device 726, I/O device 728, and/or I/O device 730 may implement industry promulgated architecture standards, including, for example, Ethernet IEEE 802 type standards, such as IEEE 802.3 for broadband and/or baseband networks, IEEE 802.3z for Gigabit Ethernet, IEEE 802.4 for token passing bus networks, IEEE 802.5 for token ring networks, IEEE 802.6 for metropolitan area networks and/or the like, Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on. Information handling system 400 of FIG. 4 is merely one example of an information handling system and/or computing platform, and the scope of the claimed subject matter is not limited in this respect.

Although the claimed subject matter has been described with a certain degree of particularity, it should be recognized that elements thereof may be altered by persons skilled in the art without departing from the spirit and/or scope of the claimed subject matter. It is believed that user discernible watermarking and/or many of its attendant applications will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A method, comprising:
   processing signals using a processor to receive a request from a client to stream video content to the client;
   in response to the received request:
      processing signals using said processor to parse the video content into a plurality of segments, wherein each one of the plurality of segments is defined according to an amount of time or data, and wherein each one of the plurality of segments comprises a plurality of frames for the video content;
      processing signals using said processor to add watermark information to selected ones, but not all, of the plurality of segments in order to transform the selected ones of the plurality of segments, wherein the watermark information is based at least in part on information that identifies the client, and wherein the watermark information is discernible when the video content is displayed at the client;
      processing signals using said processor to concatenate the plurality of segments, including said transformed ones of the plurality of segments, to result in the video content containing the watermark information, wherein after said concatenating, the video content comprises some segments with the watermark information and other segments without the watermark information; and
      subsequent to said concatenating, processing signals using said processor to begin streaming the video content to the client.

2. A method as claimed in claim 1, wherein the watermark information comprises instructions which direct placement and duration of a watermark in the video content when the video content is rendered, wherein the placement is dependent on subject matter of the video content.

3. A method as claimed in claim 1, wherein the information that identifies the client comprises information capable of uniquely identifying the client.

4. A method as claimed in claim 2, wherein said watermark comprises client information capable of contextually integrating with said subject matter of the video content at a location directed by said instructions, wherein said watermark appears to be part of the video content when the video content is viewed or heard.

5. A method, comprising:
   processing signals using a processor to render watermarked video content for display on a display device, for storage to a storage medium, or transmission to another device or combinations thereof, wherein said rendering comprises:
      receiving video content which comprises watermark information, wherein the video content comprises a plurality of segments, wherein some of the plurality of segments comprise the watermark information and others of the plurality of segments do not comprise the watermark information, wherein each one of the plurality of segments is defined according to an amount of time or data, and wherein each one of the plurality of segments comprises a plurality of frames for the video content;
      rendering the video content;
      rendering a watermark according to the watermark information, wherein rendering the watermark is based at least in part on information that identifies a client on which the watermarked video content is rendered, and wherein the watermark is discernible when the video content is displayed at the client; and
      combining the rendered watermark with the rendered video content to generate the watermarked video content.

6. A method as claimed in claim 5, wherein said video content rendering and said watermark rendering occur in real-time or near real-time, or combinations thereof.

7. A method as claimed in claim 5, further comprising:
   processing signals using said processor to combine the rendered watermark with the rendered video content to provide watermarked video content by placing the watermark in the video content at a location of the video content for a duration directed by the watermark information included in the video content.

8. A method as claimed in claim 7, wherein said video content at said location contextually corresponds to subject matter of the video content at the location where the watermark is placed, wherein the watermark appears to be part of the video content if the video content is viewed or heard.

9. A method as claimed in claim 5, wherein the information that identifies the client comprises information capable of uniquely identifying the client.

10. An apparatus, comprising:
    means for receiving a request from a client to stream video content to the client;
    means for, in response to the received request:
       parsing the video content into a plurality of segments, wherein each one of the plurality of segments is defined according to an amount of time or data, and wherein each one of the plurality of segments comprises a plurality of frames for the video content;
       watermark information to selected ones, but not all, of the plurality of segments in order to transform the selected ones of the plurality of segments, wherein the watermark information is based at least in part on information that identifies the client, and wherein the watermark information is discernible when the video content is displayed at the client;

means for concatenating the plurality of segments, including said transformed ones of the plurality of segments, to result in the video content comprising the watermark information, wherein after said concatenating, the video content comprises some segments with the watermark information and other segments without the watermark information; and subsequent to said concatenating, processing signals using said processor to begin streaming the video content to the client.

11. An apparatus as claimed in claim 10, wherein the watermark information comprises instruction which direct placement and duration of a watermark in the video content when the video content is rendered, wherein the placement is dependent on subject matter of the video content.

12. An apparatus as claimed in claim 10, wherein the information that identifies the client comprises information capable of uniquely identifying the client.

13. An apparatus as claimed in claim 11, wherein said watermark comprises client information capable of contextually integrating with said subject matter of the video content at a location directed by said instructions, wherein said watermark appears to be part of the video content when the video content is viewed or heard.

14. An apparatus, comprising:
means for rendering watermarked video content for display on a display device, for storage to a storage medium, or transmission to another device or combinations thereof, wherein said rendering comprises means for:
receiving video content which comprises watermark information, wherein the video content comprises a plurality of segments, wherein some of the plurality of segments comprise the watermark information and others of the plurality of segments do not comprise the watermark information, wherein each one of the plurality of segments is defined according to an amount of time or data, and wherein each one of the plurality of segments comprises a plurality of frames for the video content;
rendering the video content;
rendering a watermark according to the watermark information, wherein rendering the watermark is based at least in part on information which identifies a client on which the watermarked video content is rendered, and wherein the watermark is discernible when the video content is displayed at the client; and
combining the rendered watermark with the rendered video content to generate watermarked video content.

15. An apparatus as claimed in claim 14, wherein said means for video content rendering and said means for watermark rendering, or combinations thereof, operate in real-time or near real-time, or combinations thereof.

16. An apparatus as claimed in claim 14, wherein said combining means comprises means for placing the watermark in the video content at a location of the video content for a duration directed by the watermark information included in the video content.

17. An apparatus as claimed in claim 16, wherein said video content at said location contextually corresponds to subject matter of the video content at the location where the watermark is placed, wherein the watermark appears to be part of the video content if the video content is viewed or heard.

18. An apparatus as claimed in claim 14, wherein the user information that identifies the client comprises information capable of uniquely identifying the client.

19. An article comprising a non-transitory computer-readable medium comprising machine-readable instructions stored thereon which, if executed by one or more processors, are adapted to enable said one or more processors to:
receive a request from a client to stream video content to the client;
in response to the received request:
parse the video content into a plurality of segments, wherein each one of the plurality of segments is defined according to an amount of time or data, and wherein each one of the plurality of segments comprises a plurality of frames for the video content;
add watermark information to selected ones, but not all, of the plurality of segments in order to transform the selected ones of the plurality of segments, wherein the watermark information is based at least in part on information that identifies the client, and wherein the watermark information is discernible when the video content is displayed at the client;
concatenate the plurality of segments, including said transformed ones of the plurality of segments, to result in the video content comprising the watermark information, wherein after said concatenating, the video content comprises some segments with the watermark information and other segments without the watermark information; and
subsequent to said concatenating, processing signals using said processor to begin streaming the video content to the client.

20. The article of claim 19, wherein the watermark information comprises instructions which direct placement and duration of a watermark in the video content when the video content is rendered, wherein the placement is dependent on subject matter of the video content.

21. The article of claim 19, wherein the information that identifies the client comprises information capable of uniquely identifying the client.

22. The article of claim 20, wherein said watermark comprises client information capable of contextually integrating with the subject matter of the video content at a location directed by said instructions, wherein said watermark appears to be part of the video content when the video content is viewed or heard.

23. An article comprising a non-transitory computer-readable medium comprising machine-readable instructions stored thereon which, if executed by one or more processors, are adapted to enable said one or more processors to:
receive video content which comprises watermark information, wherein the video content comprises a plurality of segments, wherein some of the plurality of segments comprise the watermark information and others of the plurality of segments do not comprise the watermark information, wherein each one of the plurality of segments is defined according to an amount of time or data, and wherein each one of the plurality of segments comprises a plurality of frames for the video content;
render the video content;
render a watermark according to the watermark information, wherein rendering the watermark is based at least in part on information which identifies a client on which the watermarked video content is rendered, and wherein the watermark is discernible when the video content is displayed at the client; and combine the rendered watermark with the rendered video content to generate the watermarked video content.

24. The article of claim 23, wherein said instructions, if executed by said one or more processors, are further adapted to enable said one or more processors to: render said video content and said watermark in real-time or near real-time, or combinations thereof.

25. The article of claim 23, wherein said instructions, if executed by said one or more processors, are further adapted to enable said one or more processors to: combine said rendered watermark with said rendered video content by placing the watermark in the video content at a location of the video content for a duration directed by the watermark information included in the video content.

26. The article of claim 25, wherein said video content at said location contextually corresponds to subject matter of the video content at the location where the watermark is placed, wherein the watermark appears to be part of the video content when the video content is viewed or heard.

27. The article of claim 23, wherein the information that identifies the client comprises information capable of uniquely identifying the client.

\* \* \* \* \*